United States Patent [19]
Hong

[11] Patent Number: 5,257,147
[45] Date of Patent: Oct. 26, 1993

[54] METHOD FOR SETTING TRACKING DATA OF VARIABLE SPEED MODES IN A VIDEO TAPE RECORDER

[75] Inventor: Sang-Beom Hong, Seoguipo, Rep. of Korea

[73] Assignee: SamSung Electronics Co., Ltd., Suwon, Rep. of Korea

[21] Appl. No.: 786,703

[22] Filed: Nov. 1, 1991

[30] Foreign Application Priority Data

Dec. 21, 1990 [KR] Rep. of Korea .............. 1990-21538

[51] Int. Cl.$^5$ .......................................... G11B 15/46
[52] U.S. Cl. ............................ 360/73.08; 360/73.05
[58] Field of Search ........ 360/73.08, 73.05, 10.1–10.3, 360/73.06; 318/560, 561

[56] References Cited

U.S. PATENT DOCUMENTS 4,902,946 2/1990 Tomitaka .................... 360/73.08

Primary Examiner—Aristotelis Psitos
Assistant Examiner—Varsha V. Sheladia
Attorney, Agent, or Firm—Robert E. Bushnell

[57] ABSTRACT

A method for setting tracking data of variable speed modes in a video tape recorder having an automatic tracking circuit includes the steps of detecting current tracking data at a normal speed reproducing mode after performing an automatic tracking, and then determining a tracking data variation value by subtracting initial tracking data at a normal speed reproducing mode from the current tracking data, and setting a data variation function depending on the tracking data variation value, corresponding to an other speed reproducing mode, and detecting initial tracking data at said other speed reproducing mode and adding the data variation function to the initial tracking at said other speed reproducing mode, to transmit current tracking data at said other speed reproducing mode to a servo motor. Thus, for example even twice the normal speed reproducing mode or at a slow speed reproducing mode, the tracking is determined as related to the automatic tracking at the normal speed reproducing mode, and tracking error can be decreased.

6 Claims, 2 Drawing Sheets

METHOD FOR SETTING TRACKING DATA OF VARIABLE SPEED MODES IN A VIDEO TAPE RECORDER

FIELD OF THE INVENTION

The present invention relates to a method for setting variable speed tracking data in a magnetic reproducing apparatus, and more particularly to a method for setting variable speed tracking data in a magnetic reproducing apparatus having an automatic tracking circuit therein, which is capable of setting the tracking data at any speed reproducing mode.

BACKGROUND OF THE INVENTION

Recently, an automatic tracking circuit has been introduced for a magnetic recording and/or reproducing apparatus (hereinafter referred to as a VTR). Such a circuit makes accurate tracking possible while reproducing video signals. That is, in the VTR having an automatic tracking circuit, a microcomputer determines a data variation value between initial tracking data and current tracking data detected in the automatic tracking circuit, and controls a servo motor by use of the initial and current tracking data. However, the above automatic tracking method for a VTR is usually performed only in a normal speed reproducing mode, since an envelope form of the reproduced signal is not a shaped pattern in any speed reproducing mode except the normal speed reproducing mode. Therefore, the envelope form in automatic tracking is a problem. Accordingly, since the microcomputer controls the servo motor by using tracking data of the automatic tracking circuit only in the normal speed reproducing mode, automatic tracking can not be accurately performed in any other speed reproducing mode other than the normal speed reproducing mode. As a result, a tracking error of a reproducing screen is increased when reproduction occurs in any speed reproducing mode other than the normal speed reproducing mode.

SUMMARY OF THE INVENTION

It is therefore an object of the invention to provide a method for setting tracking data for performing accurate tracking in any speed reproducing mode.

In accordance with the present invention accurate tracking can be performed by using a data variation value obtained from a variation between initial tracking data and current tracking data which is detected from an automatic tracking circuit during the normal speed reproducing mode. Since a tracking variation in the normal speed reproducing mode is related to a variation in any other speed reproducing mode, accurate tracking can be performed by determining the tracking data in any other speed reproducing mode by use of the tracking data in the normal speed reproducing mode.

BRIEF DESCRIPTION OF THE DRAWINGS

The advantages and features of the present invention will be more apparent from the detailed description hereunder, with reference to the attached drawings, in which.

DETAILED DESCRIPTION OF THE PREFERRED EMBODIMENT

Figure 1:
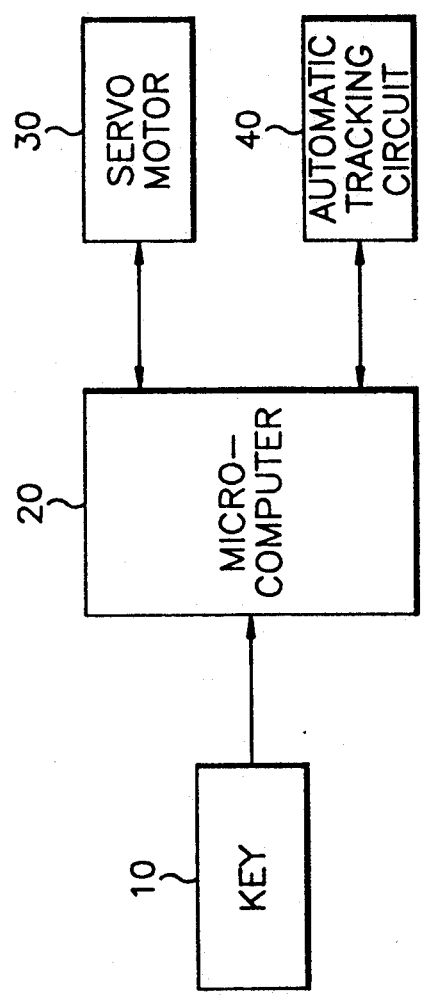
FIG. 1 shows a block diagram illustrating a system applied to the present invention.

In FIG. 1, a microcomputer 20 controls a VTR, set by signals of a key 10 and a servo motor 30, by using tracking data from an automatic tracking circuit 40. Thus, the microcomputer 20 performs an automatic tracking operation both in a normal speed reproducing mode and in any other speed reproducing modes as outlined in FIG. 2. For example, the microcomputer 20 determines a tracking data variation value between current tracking data and initial tracking data after the automatic tracking at the normal speed reproducing mode is performed, and then determines tracking data at twice the normal and/or a slow speed reproducing modes by using the tracking data variation value. Thereafter, the microcomputer 20 transmits the tracking data at twice the normal and/or the slow speed reproducing modes to the servo motor 30.

Figure 2:
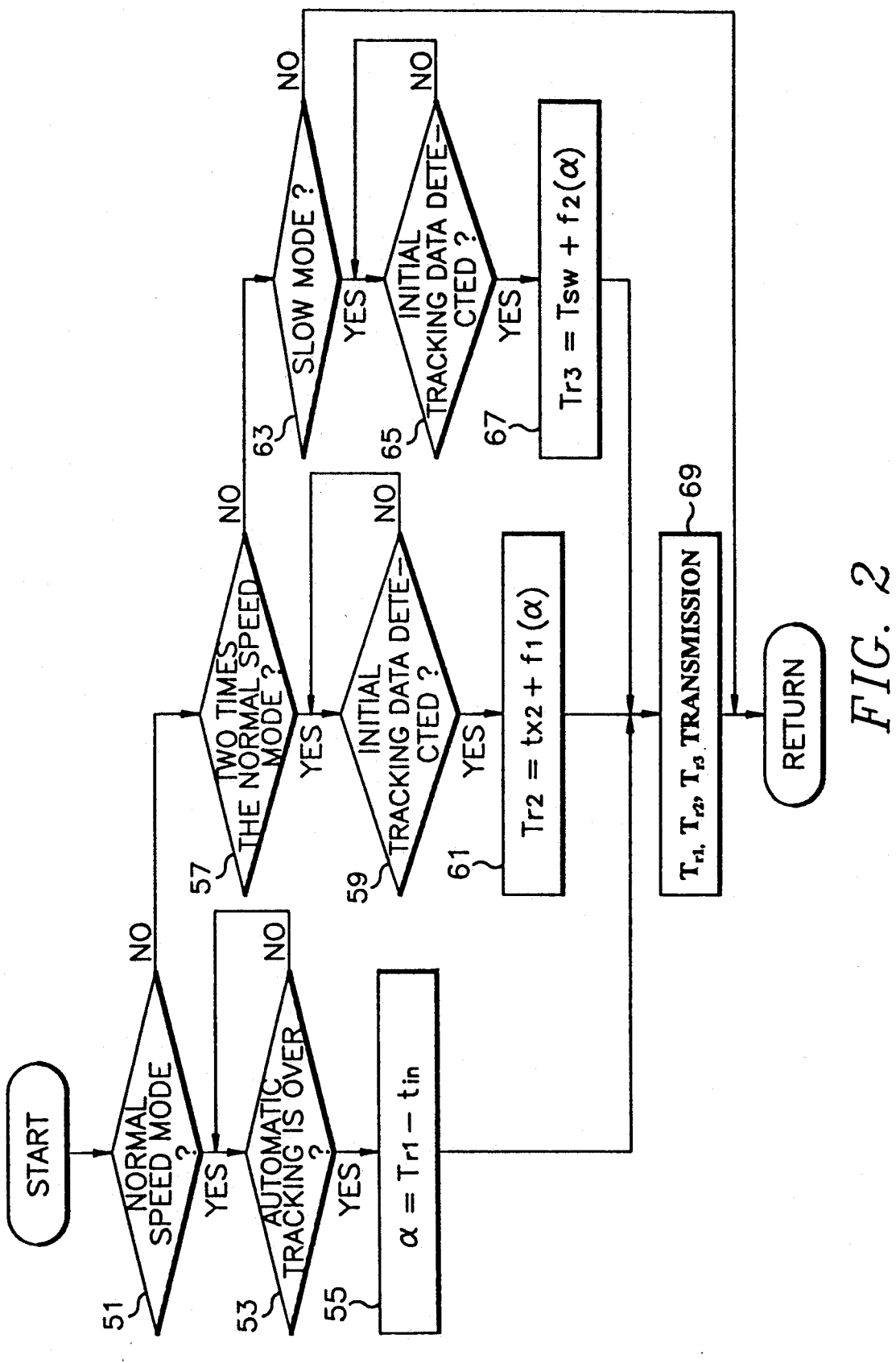
FIG. 2 shows a flow chart illustrating one preferred embodiment according to the present invention.

Referring to FIG. 2, reproducing a normal speed mode or not is determined in step 51. If the reproducing normal speed is mode present, the method goes to step 53 to determine whether automatic tracking is present. If it is, the method advances to step 55 to determine a data variation value $\alpha$ by subtracting initial tracking data $t_{in}$ from current tracking data $T_{r1}$. Thereafter, the current tracking data $T_{r1}$ is transmitted to step 69. Then, the procedure returns to start to monitor whether two times the normal and/or the slow speed reproducing mode is present in step 57. Thus, in the normal speed reproducing mode, since the current tracking data $T_{r1}$ is transmitted to the servo motor 30 after the automatic tracking operation is over, an accurate tracking operation can be performed and the tracking data variation value $\alpha$ which is determined by subtracting initial tracking data from current tracking data is used as a reference value for determining the tracking data at any other speed reproducing mode. Data variation functions $f_1(\alpha)$, $f_2(\alpha)$ at twice the normal and/or the slow speed reproducing modes are determined respectively by using the tracking data variation value $\alpha$. If the speed reproducing mode is twice the normal speed mode in step 57, the initial tracking data is detected in step 59. If it is detected, the current tracking data $T_{r2}$ is determined by adding initial tracking data $t_{x2}$ at twice the normal speed reproducing mode to the data variation function $f_1(\alpha)$ in step 61. This is followed by step 69 to transmit the current tracking data $T_{r2}$. In the same way, if the speed reproducing mode is determined in step 63, initial tracking data is detected in step 65. If detected, the current tracking data $T_{r3}$ is determined by adding initial tracking data $t_{sw}$ at the slow speed reproducing mode to the data variation function $f_2(\alpha)$ in step 67, followed by step 69. If the automatic tracking operation is complete in the automatic tracking circuit 40, the data variation value $\alpha$ between the current tracking data and the initial tracking data is determined in the microcomputer 20. Then, the difference between the initial tracking data and an optimal data variation value at twice the normal and/or the slow speed modes can be determined by using the data variation value $\alpha$. If the same tape of the VTR is used, since the tracking variation at the normal speed reproducing mode is related to the tracking variation at any other speed reproducing mode, setting optimal tracking data at any other speed reproducing mode is possible. For example, if an optimal tracking data variation value at the normal speed mode is $\alpha$, in the case of the two times the normal speed mode, the data shifted by ½α compared with the initial tracking data becomes nearly optimal tracking data at twice the normal speed reproducing mode and, the data variation functions $f_1(\alpha)$, $f_2(\alpha)$ at twice the normal speed and/or the slow speed modes can be determined.

As described above, the tracking data variation value between the current tracking data and the initial tracking data is determined after the automatic tracking at the normal speed reproducing mode is performed, and the tracking data at twice the normal and/or the slow speed reproducing modes is determined by using the tracking data variation value. Therefore, even at twice the normal speed and/or the slow speed reproducing modes, tracking similar to the automatic tracking at the normal speed reproducing mode can be made. Therefore, the tracking correction effect of the automatic tracking at the normal speed reproducing mode is provided in the twice the normal and/or the slow speed reproducing modes, to decrease a tracking error.

While the present invention has been particularly shown and described with reference to the preferred embodiment thereof, it is understood by those skilled in the art that foregoing is merely exemplary and other embodiments may be made without departing from the spirit and scope of the invention. In particular, the preferred embodiment described herein can be expanded to provide tracking data at any speed reproducing mode.

What is claimed is:

1. A method for setting tracking data of variable speed reproducing modes in a video tape recorder comprising an automatic tracking circuit, the method comprising the steps of:

detecting current tracking data at a normal speed reproducing mode after performing automatic tracking;

determining a tracking data variation value by subtracting initial tracking data at the normal speed reproducing mode from said current tracking data at the normal speed reproducing mode;

determining a data variation function corresponding to an other speed reproducing mode in dependence upon said tracking data variation value; and setting current tracking data at said other speed reproducing mode by adding initial tracking data at said other speed reproducing mode and said data variation function corresponding to said other speed reproducing mode.

2. A system for setting tracking data of variable speed reproducing modes in a video tape recorder, comprising:

detecting means for detecting current tracking data at a first speed reproducing mode after performing automatic tracking; and data processing means for determining a tracking data variation value by substracting initial tracking data at the first speed reproducing mode from said current tracking data at the first speed reproducing mode, determining a data variation function corresponding to a second speed reproducing mode in dependence upon said tracking data variation value and setting current tracking data at said second speed reproducing mode by adding initial tracking data at said second speed reproducing mode and said data variation function corresponding to said second speed reproducing mode.

3. A method for setting tracking data of variable speed reproducing modes in a video tape recorder, comprising the steps of:

detecting current tracking data in an automatic tracking circuit of the video tape recorder at a first speed reproducing mode after performing automatic tracking;

determining a tracking data variation value by subtracting initial tracking data in a microcomputer at the first speed reproducing mode from said current tracking data at the first speed reproducing mode;

determining, in the microcomputer, a data variation function corresponding to a second speed reproducing mode in dependence upon said tracking data variation value; and setting, in said microcomputer, current tracking data at said second speed reproducing mode by adding initial tracking data at said second speed reproducing mode and said data variation function corresponding to said second speed reproducing mode.

4. A method of generating variable speed tracking data in a magnetic recording apparatus performing a plurality of operational mode, said method comprising:

performing an automatic tracking operation during a normal mode of operation;

determining a tracking data variation value by subtracting an initial tracking data of said normal mode of operation from a current tracking data of said normal mode of operation after said automatic tracking operation is completed;

selecting one of said operational modes different from said normal mode;

generating a data variation function of said data variation value in dependence upon said one of said operational modes selected;

making a determination whether an initial tracking data of said one of said operational modes has been detected; and determining said variable speed tracking data by adding said initial tracking data of said one of said operational modes and said data variation function if said initial tracking data of said one of said operational modes has been detected.

5. The method as claimed in claim 4, wherein said data variation function of said data variation value is one-half times said data variation value during a fast speed mode operating at twice a speed of said normal mode.

6. The method as claimed in claim 4, further comprising:

transmitting said current tracking data of said normal mode to a servo motor during said normal mode; and transmitting said variable speed tracking to said servo motor during said one of said operational modes different from said normal mode.

* * * * *

UNITED STATES PATENT AND TRADEMARK OFFICE
CERTIFICATE OF CORRECTION

PATENT NO. : 5,257,147
DATED : October 26, 1993
INVENTOR(S) : Sang-Beom Hong

It is certified that error appears in the above-indentified patent and that said Letters Patent is hereby corrected as shown below:

Column 2,  Line 20,  Delete "reproducing" , Insert --reproducing-- after "speed";
                Line 21,  Delete "reproducing" ;
                Line 22,  After "speed", Insert --reproducing mode--, Before "present", Delete "mode" ;
                Line 68,  After "normal", Insert --reproducing-- .

Column 4,  Line 28,  Change "mode" to --modes-- .

Signed and Sealed this

Twenty-first Day of November, 1995

Attest:

BRUCE LEHMAN

Attesting Officer      Commissioner of Patents and Trademarks